United States Patent
Harrison et al.

(10) Patent No.: US 11,995,977 B2
(45) Date of Patent: May 28, 2024

(54) MONITOR CIRCUIT FOR SUMMARIZING SENSOR DATA

(71) Applicant: The Boeing Company, Chicago, IL (US)

(72) Inventors: John Harrison, Bellevue, WA (US); Xavier F. Nieves, Edmonds, WA (US); Matthew Swoboda, Bothell, WA (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 17/473,884

(22) Filed: Sep. 13, 2021

(65) Prior Publication Data

US 2021/0407281 A1  Dec. 30, 2021

Related U.S. Application Data

(63) Continuation of application No. 16/459,259, filed on Jul. 1, 2019, now Pat. No. 11,138,868.

(51) Int. Cl.
*G08B 29/04* (2006.01)
*B64D 45/00* (2006.01)
*B64F 5/60* (2017.01)

(52) U.S. Cl.
CPC ............. *G08B 29/04* (2013.01); *B64D 45/00* (2013.01); *B64F 5/60* (2017.01); *B64D 2045/0085* (2013.01)

(58) Field of Classification Search
CPC ................... G08B 29/04; B64D 45/00; B64D 2045/0085; B64F 5/60
See application file for complete search history.

(56) References Cited

U.S. PATENT DOCUMENTS

| | | | | |
|---|---|---|---|---|
| 4,303,978 A | * | 12/1981 | Shaw | G01C 21/183 701/506 |
| 8,412,389 B2 | * | 4/2013 | Tessier | G05D 1/0077 701/1 |
| 9,870,505 B2 | * | 1/2018 | Dante | G01N 21/31 |
| 11,138,868 B2 | * | 10/2021 | Harrison | B64D 45/00 |
| 2002/0064181 A1 | * | 5/2002 | Ofek | H04Q 11/0062 370/477 |
| 2002/0111705 A1 | * | 8/2002 | Coles | G06F 3/167 700/94 |
| 2011/0040470 A1 | * | 2/2011 | Qiu | F02C 7/262 701/100 |

* cited by examiner

*Primary Examiner* — Quan Zhen Wang
*Assistant Examiner* — Mancil Littlejohn, Jr.
(74) *Attorney, Agent, or Firm* — Jordan IP Law, LLC

(57) ABSTRACT

A monitor circuit is configured to receive sensor data samples at a first bit rate. The monitor circuit includes a sensor data processing circuit that is coupled to a sensor node and is configured to generate a sensor data characteristic signal for each sensor data sample. The sensor data characteristic signal for a particular sensor data sample indicates a value of a monitored parameter of the particular sensor data sample. The monitor circuit also includes a fault trigger circuit configured to determine, based on the sensor data characteristic signal, whether the sensor data samples satisfy a fault trigger. The monitor circuit further includes a summarization circuit configured to generate a sensor data summary signal based on the sensor data characteristic signal. The sensor data summary signal is provided to a summary output node at a second bit rate that is less than the first bit rate.

20 Claims, 8 Drawing Sheets

MONITOR CIRCUIT FOR SUMMARIZING SENSOR DATA

CROSS-REFERENCE TO RELATED APPLICATION

This application is a continuation application of and claims priority to U.S. patent application Ser. No. 16/459,259, entitled "MONITOR CIRCUIT FOR SUMMARIZING SENSOR DATA," filed on Jul. 1, 2019, the disclosure of which is incorporated herein by reference in its entirety.

FIELD OF THE DISCLOSURE

The present disclosure is related to a monitor circuit.

BACKGROUND

Over time, different components in an aircraft are subject to wear and tear. As a non-limiting example, different components of an anti-lock brake system, such as an electronic brake controller, a vehicle speed sensor, etc., are subject to wear and tear from use over extended periods of time. Thus, over the course of months or years, an aircraft component may need to be replaced to ensure that the aircraft is operating at an acceptable level of efficiency.

Sensors and monitor logic integrated into an aircraft generate fault codes (or fault messages) when the aircraft component has degraded to such a point that maintenance action is required. As a non-limiting example, the sensors can generate sensor data that indicates a level of operational efficiency associated with the aircraft component. The monitor logic monitors the sensor data and generates a fault code when the level of operational efficiency falls below a fault threshold. When the fault code is generated, prior to the next scheduled flight, maintenance personnel perform maintenance operations to ensure that the aircraft is operating according to safety protocols. For example, maintenance personnel may inspect, replace, or reset the aircraft component when the fault code is generated.

However, because the maintenance operations are performed in response to generation of the fault code, the next scheduled flight may be delayed while the maintenance operations are performed. Thus, some unexpected downtime is due to the generation of the fault code for aircraft components that slowly degraded over an extended period of time.

SUMMARY

According to one implementation of the present disclosure, a monitor circuit includes a sensor node configured to couple to a sensor and to receive sensor data samples at a first bit rate. The monitor circuit also includes a sensor data processing circuit coupled to the sensor node and configured to generate a sensor data characteristic signal for each sensor data sample. The sensor data characteristic signal is for a particular sensor data sample and indicates a value of a monitored parameter of the particular sensor data sample. The monitor circuit also includes a fault output node and a fault trigger circuit. The fault trigger circuit is coupled to the sensor data processing circuit and to the fault output node. The fault trigger circuit is configured to determine, based on the sensor data characteristic signal, whether the sensor data samples satisfy a fault trigger. The fault trigger circuit is also configured to provide a fault indication signal to the fault output node in response to a determination that the sensor data samples satisfy the fault trigger. The monitor circuit also includes a summary output node and a summarization circuit. The summarization circuit is coupled to the sensor data processing circuit and to the summary output node. The summarization circuit is configured to generate a sensor data summary signal based on the sensor data characteristic signal and to provide the sensor data summary signal to the summary output node at a second bit rate. The second bit rate is less than the first bit rate, and the sensor data summary signal is output independent of whether the sensor data samples satisfy the fault trigger.

According to another implementation of the present disclosure, a method of summarizing sensor data includes receiving, at a sensor data processing circuit, sensor data samples from a sensor at a first bit rate. The method also includes generating, at the sensor data processing circuit, a sensor data characteristic signal for each sensor data sample. The sensor data characteristic signal for a particular sensor data sample indicates a value of a monitored parameter of the particular sensor data sample. The method also includes determining, at a fault trigger circuit, whether the sensor data samples satisfy a fault trigger based on the sensor data characteristic signal. A fault indication signal is generated in response to a determination that the sensor data samples satisfy the fault trigger. The method also includes generating, at a summarization circuit, a sensor data summary signal based on the sensor data characteristic signal. The sensor data summary signal indicates a trend of the values of the monitored parameter of the sensor data samples. The method further includes transmitting the sensor data summary signal to a summary output node at a second bit rate that is less than the first bit rate. The sensor data summary signal is output independent of whether the sensor data samples satisfy the fault trigger.

According to another implementation of the present disclosure, a computer-readable storage device stores instructions that, when executed by a processor, cause the processor to perform operations including receiving sensor data samples from a sensor at a first bit rate. The operations also include generating a sensor data characteristic signal for each sensor data sample. The sensor data characteristic signal for a particular sensor data sample indicates a value of a monitored parameter of the particular sensor data sample. The operations also include determining whether the sensor data samples satisfy a fault trigger based on the sensor data characteristic signal. A fault indication signal is generated in response to a determination that the sensor data samples satisfy the fault trigger. The operations also include generating a sensor data summary signal based on the sensor data characteristic signal. The sensor data summary signal indicates a trend of the values of the monitored parameter of the sensor data samples. The operations further include initiating transmission of the sensor data summary signal to a summary output node at a second bit rate that is less than the first bit rate. The sensor data summary signal is output independent of whether the sensor data samples satisfy the fault trigger.

Additionally, the features, functions, and advantages that have been described can be achieved independently in various implementations or may be combined in yet other implementations, further details of which are disclosed with reference to the following description and drawings.

DETAILED DESCRIPTION

Figure 1:
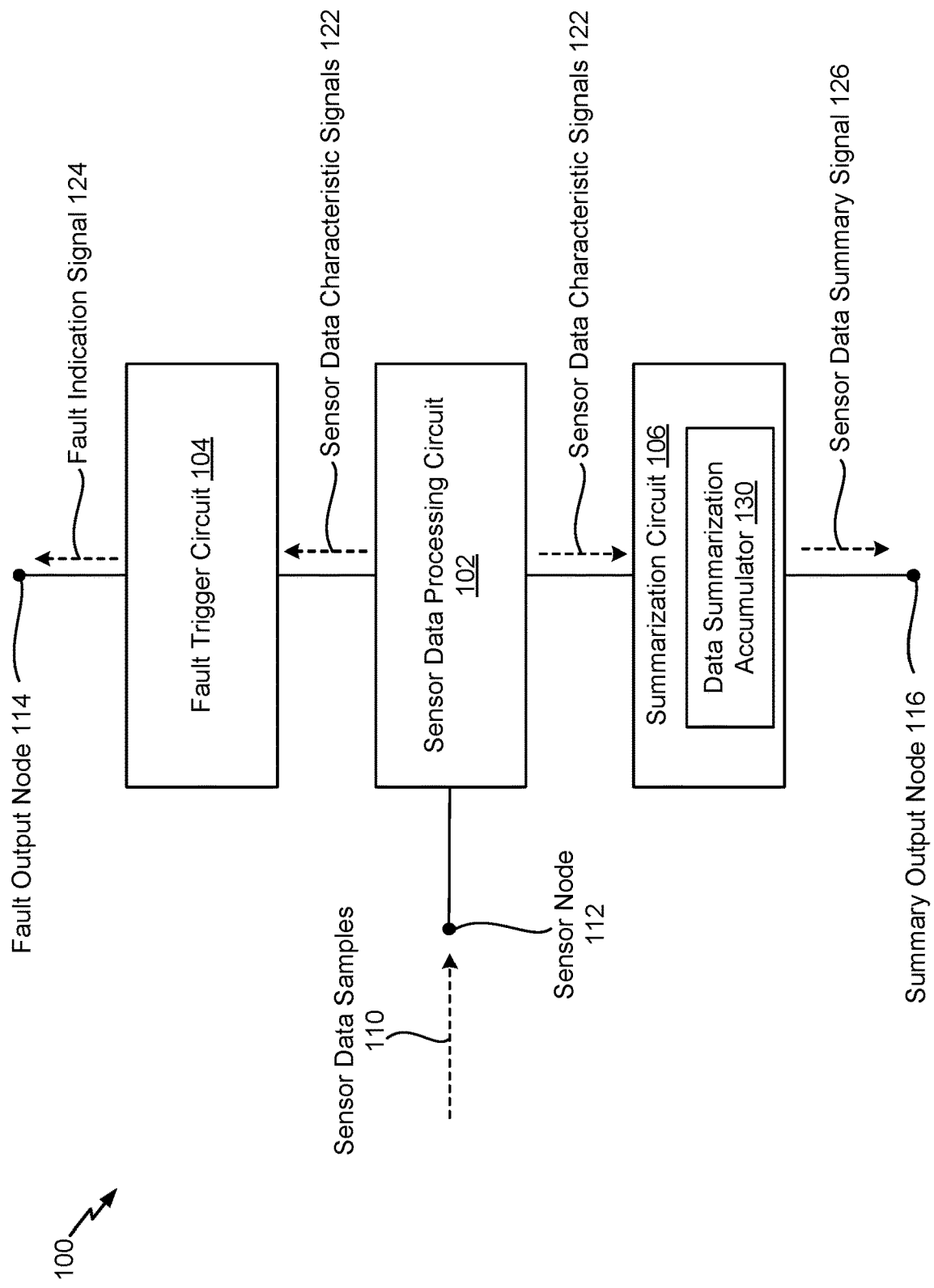
FIG. 1 is a diagram of an example of a monitor circuit that is operable to detect degradation of a component.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, multiple sensor data samples are illustrated and associated with reference numbers 110A, 110B, etc. When referring to a particular one of these sensor data samples, such as the sensor data sample 110A, the distinguishing letter "A" is used. However, when referring to any arbitrary one of these sensor data samples or to these sensor data samples as a group, the reference number 110 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

According to the techniques described herein, an onboard sensor generates data for an aircraft component and provides the data to an onboard monitor circuit at a first bit rate (e.g., a relatively high bit rate that is supported by local circuitry of the onboard monitor circuit). The monitor circuit processes the data to generate sensor data characteristic signals. Each sensor data characteristic signal indicates a parameter value for a particular monitored parameter of the aircraft component. To illustrate, if the aircraft component is an electronic brake controller used in an anti-lock brake system of an aircraft, each parameter value can indicate a particular performance metric associated with the electronic brake controller. If the parameter values satisfy a fault trigger, the monitor circuit generates a fault indication signal (e.g., a fault code or a fault message). If the fault indication signal is generated, aircraft delays can occur while maintenance performs repair or replacement operations. To avoid such aircraft delays and to enable predictive supply chain operations, the monitor circuit generates sensor data summary signals that are transmitted to a remote device at a second bit rate (e.g. a lower bit rate that is supported by busses used to transfer data between line replaceable units (LRUs) of the aircraft). The sensor data summary signals indicate trends and patterns of the parameter values, and are transmitted independent of whether the fault indication signal is generated. As a result, maintenance personnel with access to the remote device can access the trends and patterns of the parameter values to detect degradation or changes associated with the aircraft component prior to the failure occurring (e.g., prior to generation of the fault indication signal). Based on the early detection, maintenance personnel can schedule maintenance operations prior to the failure and at a time that will not result in aircraft delays.

FIG. 1 is a diagram of an example of a monitor circuit 100 that is operable to detect degradation of a component. The monitor circuit 100 can be integrated into a vehicle, such as an aircraft, to detect component degradation before a failure message for the component of the vehicle is issued. Although the techniques described herein are in the context of an aircraft, it should be understood that the techniques can be applied to other vehicles or systems. The monitor circuit 100 includes a sensor data processing circuit 102, a fault trigger circuit 104, and a summarization circuit 106. The fault trigger circuit 104 is coupled to the sensor data processing circuit 102, and the summarization circuit 106 is coupled to the sensor data processing circuit 102.

A sensor node 112 is coupled to the sensor data processing circuit 102. The sensor node 112 is configured to couple to a sensor, such as a sensor 302 illustrated in FIG. 3, for a particular aircraft component or system. The sensor data processing circuit 102 is configured to receive sensor data samples 110 from the sensor via the sensor node 112. The sensor node 112, and thus the sensor data processing circuit 102, is configured to receive the sensor data samples 110 at a first bit rate. According to one implementation, the first bit rate is between 5 Hertz (Hz) and 10,000 Hz, such as 500 Hz. It should be understood that the above-described range for the first bit rate is merely a non-limiting example and that the first bit rate can be a bit rate outside of the above-described range in some implementations. The sensor data samples 110 can include a plurality of data bits that indicate a condition, status, metric, or characteristic of the particular aircraft component or system. As a non-limiting example, if the particular aircraft component or system is an electronic brake controller of an anti-lock brake system, the sensor data samples 110 indicate properties of the electronic brake controller. The sensor data samples 110 can indicate properties of any components or systems that have a reduced operational efficiency over a period of time.

The sensor data processing circuit 102 is configured to generate a sensor data characteristic signal 122 for each sensor data sample of the sensor data samples 110. The sensor data characteristic signals 122 are generated at the first bit rate. The sensor data characteristic signal 122 can indicate a particular condition, status, metric, or characteristic of the particular aircraft component or system. For example, the sensor data processing circuit 102 can identify and extract a particular condition, status, metric, or characteristic of the plurality of conditions, statuses, metrics, or characteristics in the sensor data samples 110 to generate the sensor data characteristic signals 122. According to one implementation, the sensor data characteristic signal 122 is the subset of variables which represent the entire state of the component at any given point in time. Thus, the sensor data characteristic signal 122 for a particular sensor data sample 110 indicates a value of a monitored parameter, such as a monitored parameter 200 of FIG. 2, of the particular sensor data sample 110. The monitored parameter 200 is any data parameter that indicates properties of a high data rate system in a vehicle. Non-limiting examples of high data rate systems include an anti-skid system, an electrical power control system, an aircraft spoiler system, a transmission control system, a guidance control system, a laser pointing system, an anti-lock brake system, etc.

As a non-limiting example, if the monitored parameter 200 is an electrical anti-lock parameter that indicates a condition of a component of an anti-lock brake system, the sensor data processing circuit 102 can identify and extract the electrical anti-lock parameter from the sensor data samples 110. As a result, the sensor data characteristic signal 122 can indicate a value of the electrical anti-lock parameter. In this example, for each sensor data sample 110 received at the sensor data processing circuit 102, the sensor data processing circuit 102 generates a corresponding sensor data characteristic signal 122 that indicates the value of the electrical anti-lock parameter. In other examples, the sensor data characteristic signals 122 indicate another characteristic associated with the sensor data samples 110. The sensor data processing circuit 102 is configured to send, at the first bit rate, the sensor data characteristic signals 122 to the fault trigger circuit 104 and to the summarization circuit 106.

The fault trigger circuit 104 is coupled to a fault output node 114. The fault trigger circuit 104 is configured to determine, based on the sensor data characteristic signal 122, whether the sensor data samples 110 satisfy a fault trigger. To illustrate, the fault trigger can correspond to threshold value associated with the monitored parameter 200. If one or more of the sensor data samples 110 indicate that the value of the monitored parameter 200 satisfies the threshold value, the fault trigger circuit 104 can generate a fault indication signal 124 that is provided to the fault output node 114. Thus, the fault trigger circuit 104 provides the fault indication signal 124 to the fault output node 114 in response to a determination that the sensor data samples 110 satisfy the fault trigger. The fault trigger depends on the parameter that is monitored. Based on the implementation, the fault trigger can be satisfied if a single value of the monitored parameter 200 is greater than a threshold, less than the threshold, greater than or equal to the threshold, less than or equal to the threshold, or equal to the threshold. According to different implementations, the fault trigger is satisfied if multiple conditions are met. As a non-limiting example, the fault trigger can be satisfied if three values (e.g., three consecutive values or three values within a particular time period) of the monitored parameter are greater than a threshold. If the fault indication signal 124 is provided to the fault output node 114, when the aircraft lands, aircraft maintenance personnel can be alerted to perform maintenance operations. However, if the aircraft has a quick turnaround time and is scheduled to depart relatively shortly after landing, the maintenance operations can result in significant delays.

To reduce the likelihood of significant delays, the monitor circuit 100 can detect component degradation to the fault trigger circuit 104 generating the fault indication signal 124 so that maintenance can proactively schedule maintenance operations at a convenient time prior to a detected aircraft fault. For example, a summary of the sensor data samples 110 is provided to a remote device, such as a prognostic computing device, to enable the remote device to determine whether a fault condition is approaching. For example, when the sensor data samples 110 indicate that the value of the monitored parameter 200 is trending toward the threshold value that would trigger a fault, a summary indicating as much is transmitted to the remote device to enable maintenance operations to be proactively scheduled. The summarization circuit 106 is used to generate the summary and initiate transmission of the summary to the remote device. A summary is used because modern aircrafts include hundreds or thousands of sensors and associated sensor data processing circuits and fault trigger circuits, such as the sensor data processing circuit 102 and the fault trigger circuit 104. Sending sensor data characteristic signals, such as the sensor data characteristic signal 122, from each of the sensor data processing circuits to the remote device would require a significant increase in the data rate capabilities of data busses onboard the aircraft, which would increase the weight of the aircraft and decrease operational efficiency of the aircraft.

The summarization circuit 106 is coupled to a summary output node 116. The summarization circuit 106 is configured to generate a sensor data summary signal 126 as a summary of the sensor data characteristic signals 122 and is configured to provide the sensor data summary signal 126 to the summary output node 116. The nature of the summary indicated by sensor data summary signal 126 is based on the fault trigger. For example, if the fault trigger is an upper threshold on current, then the summary indicated by the sensor data summary signal 126 can be a maximum current in a set of the sensor data samples 110. To illustrate, if the fault trigger circuit 104 generates the fault indication signal 124 in response to a current associated with a particular sensor data sample 110 exceeding five-hundred (500) microamperes, the summary indicated by the sensor data summary signal 126 can indicate a maximum current in a set of twenty sensor data samples 110. As another example, if the fault trigger is a threshold number of sensor data samples 110 having a value of the monitored parameter 200 that is greater than a threshold measurement value, then the summary indicated by the sensor data summary signal 126 can be the number of consecutive sensor data samples 110 having a value of the monitored parameter 200 that is greater than the threshold measurement value. To illustrate, the summary indicated by the sensor data summary signal 126 can indicate a count of adjacent (i.e., consecutive) sensor data samples 110 having values larger than the threshold measurement value.

The summarization circuit 106 provides the sensor data summary signal 126 to the summary output node 116 at a second bit rate that is less than the first bit rate. The first bit rate is a relatively high bit rate that is supported by local circuitry of the monitor circuit 100 (e.g., an onboard monitor circuit). The second bit rate is a lower bit rate that is supported by busses used to transfer data between LRUs of a vehicle, such as an aircraft. According to one implementation, the first bit rate is a multiple of the second bit rate. According to yet another implementation, the second bit rate is a user-defined bit rate that is lower than the first bit rate. According to yet another implementation, the second bit rate is between 1 Hz and 200 Hz, such as 5 Hz. It should be understood that the above-described range for the second bit rate is merely a non-limiting example and that the second bit rate can be a bit rate outside of the above-described range in some implementations. Thus, the summarization circuit 106 can process and summarize the sensor data characteristic signals 122 received at the first bit rate to generate a summary (e.g., the sensor data summary signal 126) that is transmitted to a remote device at the second bit rate. The sensor data summary signal 126 is output independent of whether the sensor data samples 110 have values of the monitored parameter 200 that satisfy the fault trigger. As a result, the remote device can monitor a summary of the sensor data samples 110 to detect component degradation before a failure message is issued.

According to one implementation, the summarization circuit 106 is configured to apply a data summarization accumulator 130 to the sensor data characteristic signals 122 to generate the sensor data summary signal 126. The data summarization accumulator 130 can include at least one of a maximum data value filter, a minimum data value filter, or a maximum count value filter. The maximum data value filter is configured to identify a maximum data value of the monitored parameter 200 in a set of the sensor data samples 110 to send the maximum value as the summary of the set of the sensor data samples 110. The minimum data value filter is configured to identify a minimum data value of the monitored parameter 200 in a set of the sensor data samples 110 and to send the minimum value as the summary of the set of the sensor data samples 110. The maximum count value filter is configured to identify a number (e.g., a maximum number) of consecutive sensor data samples 110 that have a value of the monitored parameter 200 that meet a particular criterion. Thus, the summarization circuit 106 uses the data summarization accumulator 130 to summarize each sensor data sample 110 as opposed to down-sampling the sensor data samples 110.

The monitor circuit 100 of FIG. 1 enables early detection of component degradation so that maintenance can proactively schedule maintenance operations at a convenient time prior to a detected aircraft fault. For example, the summarization circuit 106 generates the sensor data summary signal 126 that summarizes relevant information associated with the sensor data samples 110. The sensor data summary signal 126 is provided to the remote device to enable the remote device to determine whether a trend in the data indicates that a fault is approaching. Thus, the remote device can access more of the sensor data samples 110, in the form of a summary indicated by the sensor data summary signal 126, without upgrading aircraft busses to be compatible with faster data rates. If the remote device determines that a trend in the data indicates that a fault is approaching, maintenance operators can schedule and perform maintenance operations in such a manner as to not delay a flight.

Figure 2:
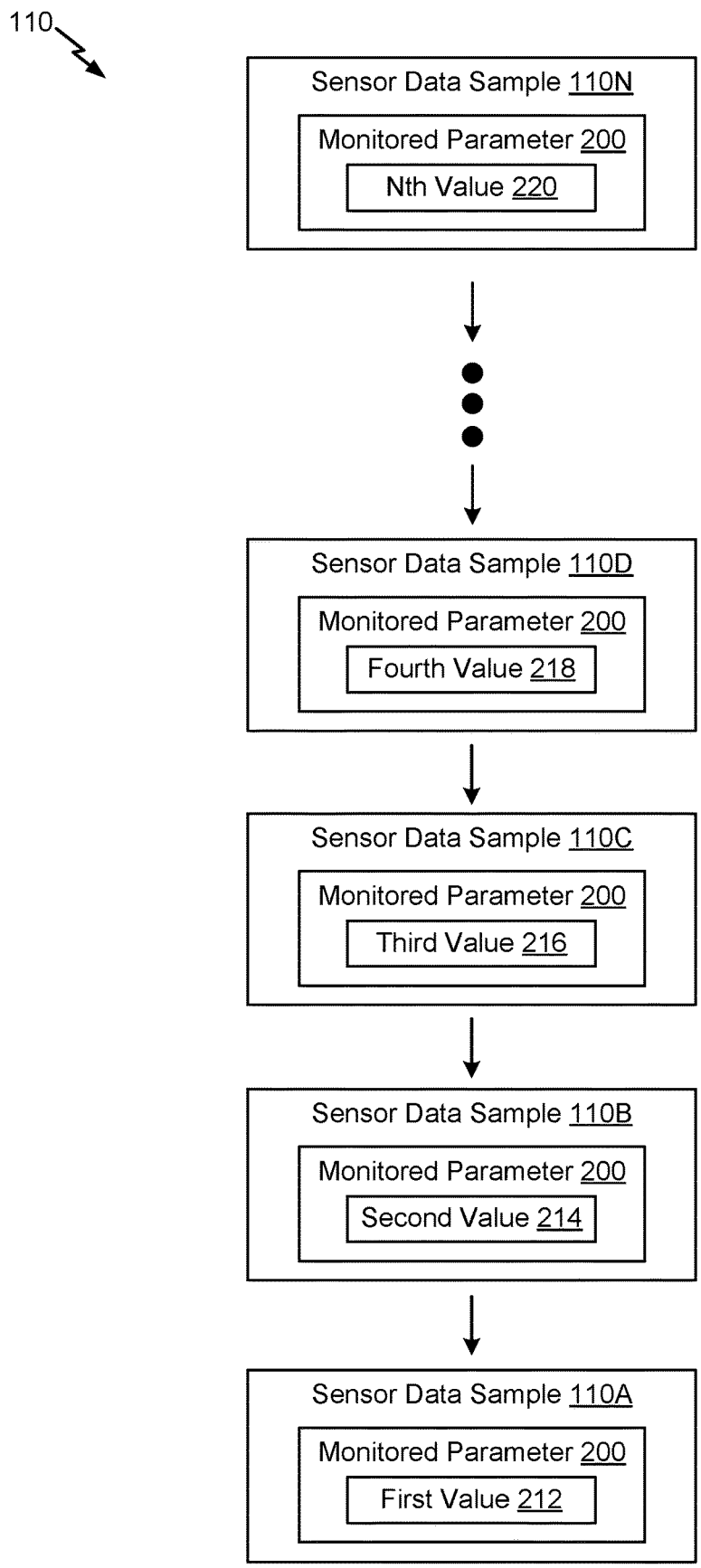
FIG. 2 is an example of sensor data samples that are provided to the monitor circuit.

FIG. 2 is an example of sensor data samples 110 that are provided to the monitor circuit 100. The sensor data samples 110 include a sensor data sample 110A, a sensor data sample 110B, a sensor data sample 110C, a sensor data sample 110D, and a sensor data sample 110N. Although five sensor data samples 110 are illustrated in FIG. 2, in other implementations, additional sensor data samples can be provided to the monitor circuit 100. The sensor data samples 110 are provided to the monitor circuit 100 at the first bit rate.

The sensor data sample 110A includes a first value 212 of the monitored parameter 200. As an example, the monitored parameter 200 is the electrical anti-lock parameter that indicates the condition the component of the anti-lock brake system. In this example, the first value 212 of the monitored parameter 200 indicates the condition of the component at the time the sensor data sample 110A is generated. In other examples, the monitored parameter 200 is a parameter associated with another aircraft component or system.

The sensor data sample 110B includes a second value 214 of the monitored parameter 200, the sensor data sample 110C includes a third value 216 of the monitored parameter 200, the sensor data sample 110D includes a fourth value 218 of the monitored parameter 200, and the sensor data sample 110N includes an Nth value 220 of the monitored parameter 200 (where N is an integer greater than four).

The sensor data processing circuit 102 extracts the values 212-220 of the monitored parameter 200 from the sensor data samples 110A-110N to generate the corresponding sensor data characteristic signals 122. In a similar manner as described above, the summarization circuit 106 summarizes the extracted values 212-220 to generate the sensor data summary signal 126. As a non-limiting example, if the summarization circuit 106 applies the maximum data value filter, the summarization circuit 106 determines that a first particular value (of the values 212-220) is the highest value of the monitored parameter 200 and sends the first particular value as the summary of the extracted values 212-220. As another non-limiting example, if the summarization circuit 106 applies the minimum data value filter, the summarization circuit 106 determines that a second particular value (of the values 212-220) is the lowest value of the monitored parameter 200 and sends the second particular value as the summary of the extracted values 212-220. As another non-limiting example, if the summarization circuit 106 applies the maximum count value filter, the summarization circuit determines that three consecutive values (of the values 212-220) satisfy a criterion and send the three consecutive values as the summary of the extracted values 212-220.

The sensor data summary signal 126 is provided to the remote device to enable the remote device to detect component degradation before a failure message (e.g., the fault indication signal 124) is issued. Based on the sensor data summary signal 126, or based on a report generated in light of the sensor data summary signal 126, the remote device can analyze a summary of the sensor data samples 110-110N to identify a trend that indicates component degradation. As a result, maintenance operators can schedule and perform maintenance operations in such a manner as to not delay a flight.

Figure 3:
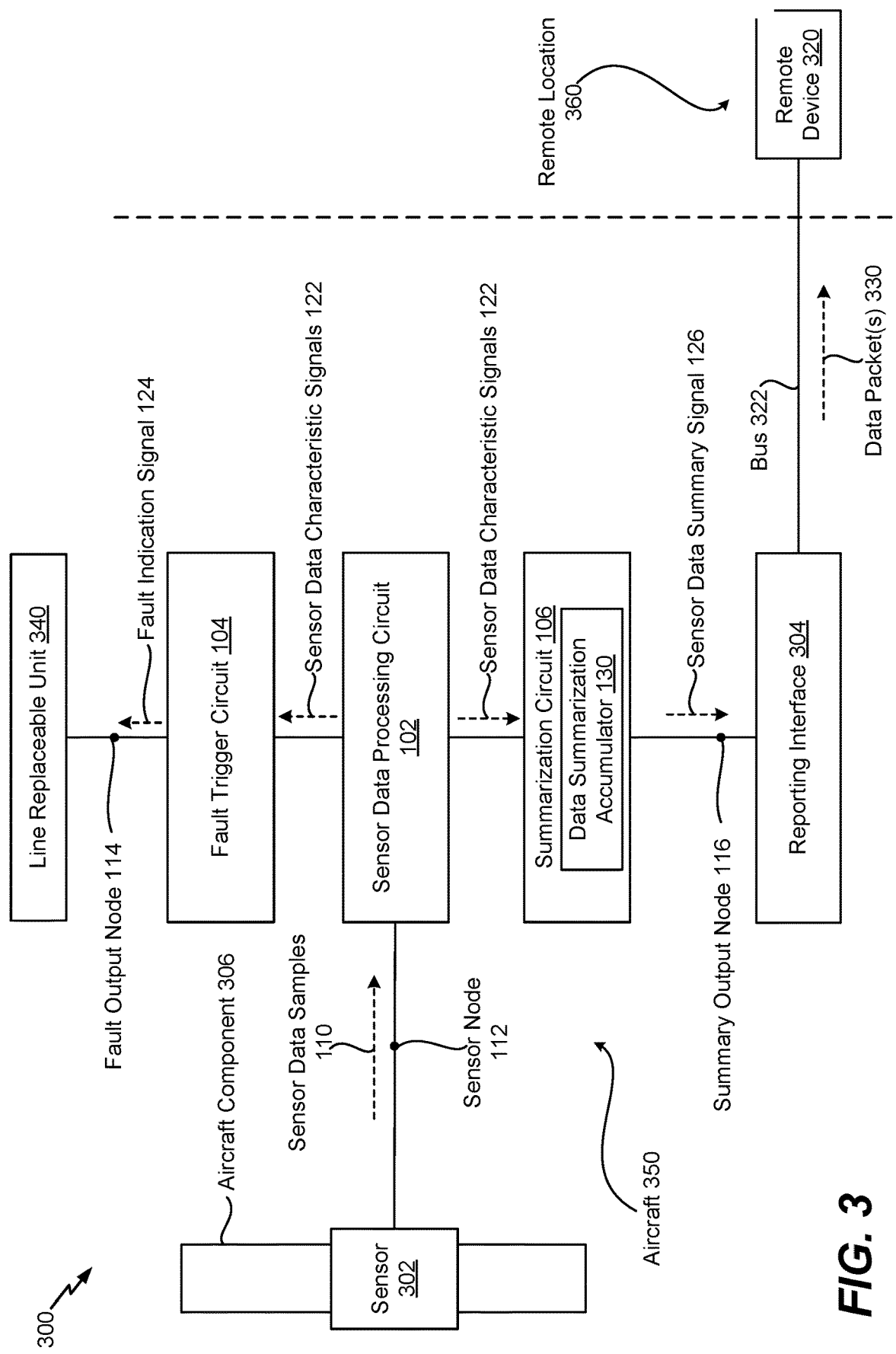
FIG. 3 is a diagram of an example of a system that is operable to detect degradation of a component.

FIG. 3 is a diagram of an example of a system 300 that is operable to detect degradation of a component. The system 300 includes the monitor circuit 100 illustrated in FIG. 1. For example, the system 300 includes the sensor data processing circuit 102, the fault trigger circuit 104, and the summarization circuit 106. Additionally, the system 300 includes the sensor 302 that is coupled to the sensor data processing circuit 102 via the sensor node 112. The system 300 also includes a reporting interface 304 coupled to the summarization circuit 106 via the summary output node 116. In the illustrative example of FIG. 3, the sensor data processing circuit 102, the fault trigger circuit 104, the summarization circuit 106, the sensor 302, and the reporting interface 304 are included in an aircraft 350.

The sensor 302 is coupled to an aircraft component 306. According to one example, the aircraft component 306 is an electronic brake controller integrated into the anti-lock brake system. In other examples, the aircraft component 306 is another system or component within the aircraft 350. The sensor 302 is configured to generate the sensor data samples 110 and to provide the sensor data samples 110 to the sensor data processing circuit 102 via the sensor node 112. To illustrate, the sensor 302 generates one or more sensor readings for different parameters associated with the aircraft component 306. Based on the one or more sensor readings, the sensor 302 generates the sensor data samples 110. Each sensor data sample 110 includes the different sensor readings for the aircraft component 306 at a corresponding time instant.

The sensor data processing circuit 102 generates the sensor data characteristic signal 122 for each sensor data sample 110 received. The sensor data characteristic signal 122 for a particular sensor data sample 110 indicates the value of the monitored parameter 200 for the particular data sample 110. For example, with reference to FIG. 2, the sensor data characteristic signal 122 for the sensor data sample 110A indicates the first value 212 of the monitored parameter 200, the sensor data characteristic signal 122 for the sensor data sample 110B indicates the a second value 214 of the monitored parameter 200, the sensor data characteristic signal 122 for the sensor data sample 110C indicates the third value 216 of the monitored parameter 200, etc. Thus, the sensor data processing circuit 102 identifies and extracts values of the monitored parameter 200 from each sensor data sample 110 to generate the sensor data characteristic signals 122. The sensor data characteristic signals 122 are provided to the fault trigger circuit 104 and to the summarization circuit 106 at the first bit rate which identifies and extracts the smallest subset of variables which represent the entire state of the system at any given point in time.

The fault trigger circuit 104 determines whether one or more of the sensor data samples 110 satisfy the fault trigger based on the corresponding sensor data characteristic signals 122. To illustrate, if the first value 212 of the monitored parameter 200 is lower than a threshold value for the aircraft component 306, the fault trigger circuit 104 determines that the sensor data sample 110A satisfies the fault trigger. In response to determining that the sensor data sample 110A satisfies the fault trigger, the fault trigger circuit 104 generates the fault indication signal 124 and provides the fault indication signal 124 to a line replaceable unit (LRU) 340 of the aircraft 350 via the fault output node 114. As a result, a fault message for the aircraft component 306 is generated and aircraft maintenance personnel are alerted to perform maintenance operations on the aircraft component 306. Depending on the scheduling, performance of the maintenance operations on the aircraft component 306 can result in significant delays of the aircraft 350.

To reduce the likelihood of the significant delays, the summarization circuit 106 can summarize the sensor data characteristic signals 122 and provide the summary to the remote device 320 via the reporting interface 304. As described above, the summarization circuit 106 generates the sensor data summary signal 126 as the summary of the sensor data characteristic signals 122 provides the sensor data summary signal 126 to the summary output node 116. The nature of the summary indicated by sensor data summary signal 126 is based on the fault trigger. The reporting interface 304 receives the sensor data summary signal 126, via the summary output node 116, at the second bit rate.

The reporting interface 304 is configured to generate one or more data packets 330 based on the sensor data summary signal 126. The one or more data packets 330 are usable to generate a report that summarizes the condition of the aircraft component 306. According to one implementation, the report indicates a proximity of the values 212-220 of the monitored parameter 200 of the sensor data samples 110 to the fault trigger. The reporting interface 304 is configured to initiate transmission of the one or more data packets 330, via a bus 322 and at the second bit rate, to the remote device 320 at a remote location 360. According to one implementation, the remote device 320 is a prognostic computing device that generates the report based on the one or more data packets. The remote device 320 can be located at a maintenance station to enable maintenance personnel to identify impending failures with the aircraft component 306 prior to the failure occurring (e.g., prior to generation of the fault indication signal 124). For example, maintenance personnel can review the report to determine whether the values 212-220 of the monitored parameter 200 indicate that an impending fault message for the aircraft component 306 will occur within a period of time (e.g., a week, a month, a year, etc.). Based on the determination, maintenance personnel can determine that preventative maintenance action is warranted prior to the fault trigger circuit 104 generating the fault indication signal 124. As a result, maintenance personnel can schedule and perform maintenance operations on the aircraft component 306 prior to a fault occurring and at a convenient time such as not to delay a flight.

The system 300 of FIG. 3 enables early detection of component degradation so that maintenance personnel can proactively schedule maintenance operations at a convenient time prior to a detected aircraft fault. For example, the summarization circuit 106 generates the sensor data summary signal 126 that summarizes relevant information associated with the sensor data samples 110. The reporting interface 304 sends the summary, indicated by sensor data summary signal 126, to the remote device 320 as data packets 330. The data packets 330 are provided to the remote device 320 to enable the remote device 320 to generate a report that indicates whether an impending fault is approaching. As a result, maintenance operators can schedule and perform maintenance operations in such a manner as to not delay a flight.

Figure 4:
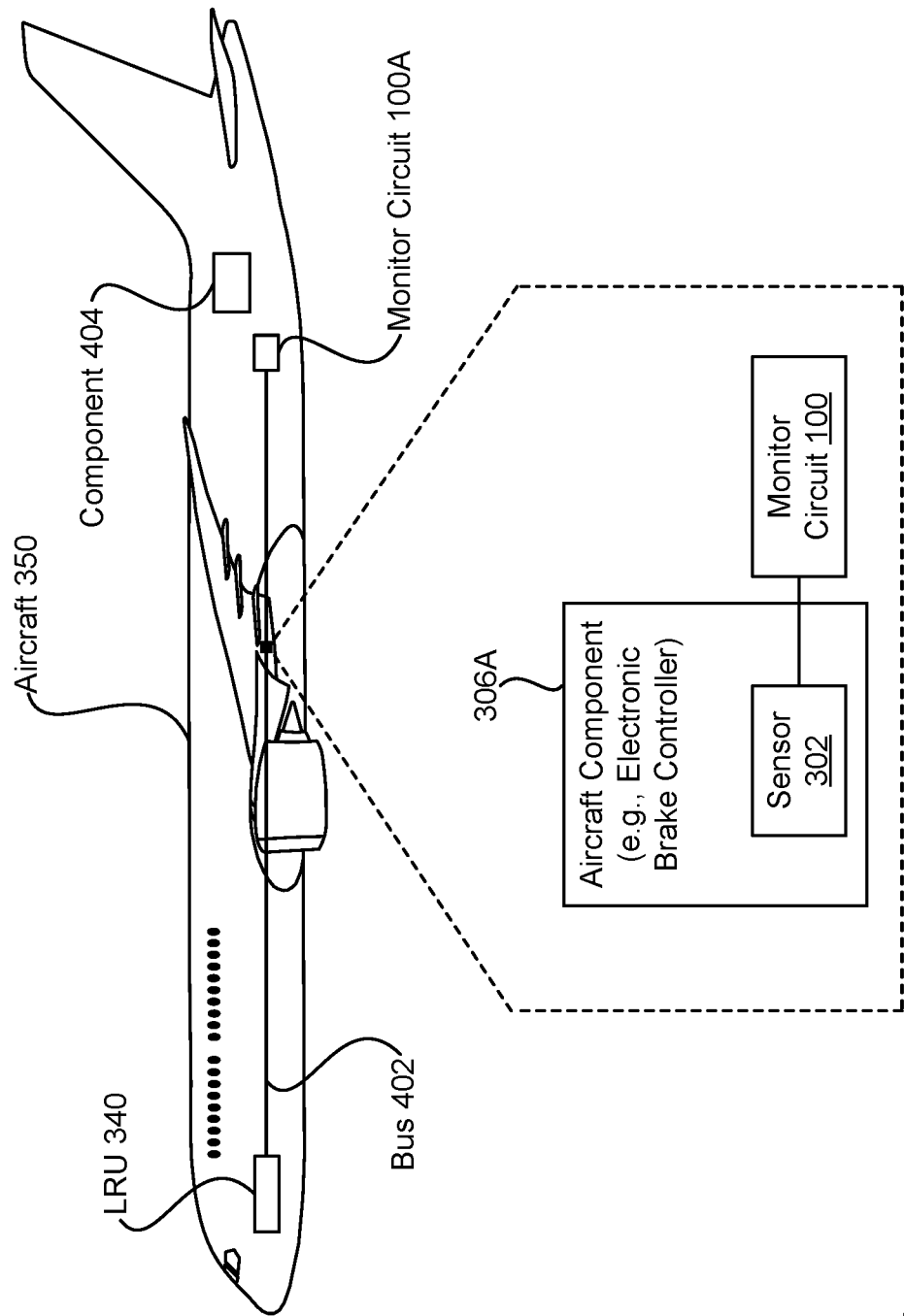
FIG. 4 is a diagram of an example of an aircraft that includes the monitor circuit of FIG. 1.

FIG. 4 is an example of a diagram of the aircraft 350 that includes the monitor circuit 100 of FIG. 1. In the illustrative example of FIG. 4, an aircraft component 306A is integrated into an anti-lock brake system of the aircraft 350. In the illustrative example of FIG. 4, the aircraft component 306A is an electronic brake controller that is coupled to other components (not shown) of the anti-lock brake system. The sensor 302 is inserted in (or proximate to) to the aircraft component 306A and is configured to generate the sensor data samples 110. The sensor data samples 110 are provided to the monitor circuit 100. As described with respect to FIG. 1-3, the monitor circuit 100 detects component degradation of the aircraft component 306A at early stages so that maintenance personnel can proactively schedule maintenance operations at a convenient time prior to a detected aircraft fault.

The aircraft 350 also includes other components and sensors. For example, as illustrated in FIG. 4, the LRU 340 is located near the front of the aircraft 350 and is coupled to the monitor circuit 100 via a bus 402. The monitor circuit 100 (or a monitor circuit 100A located towards the rear of the aircraft 350 is configured to provide the fault indication signal 124 to the LRU 340 via the bus 402. Additionally, other components 404 or circuits are located towards the rear of the aircraft 350.

Figure 5:
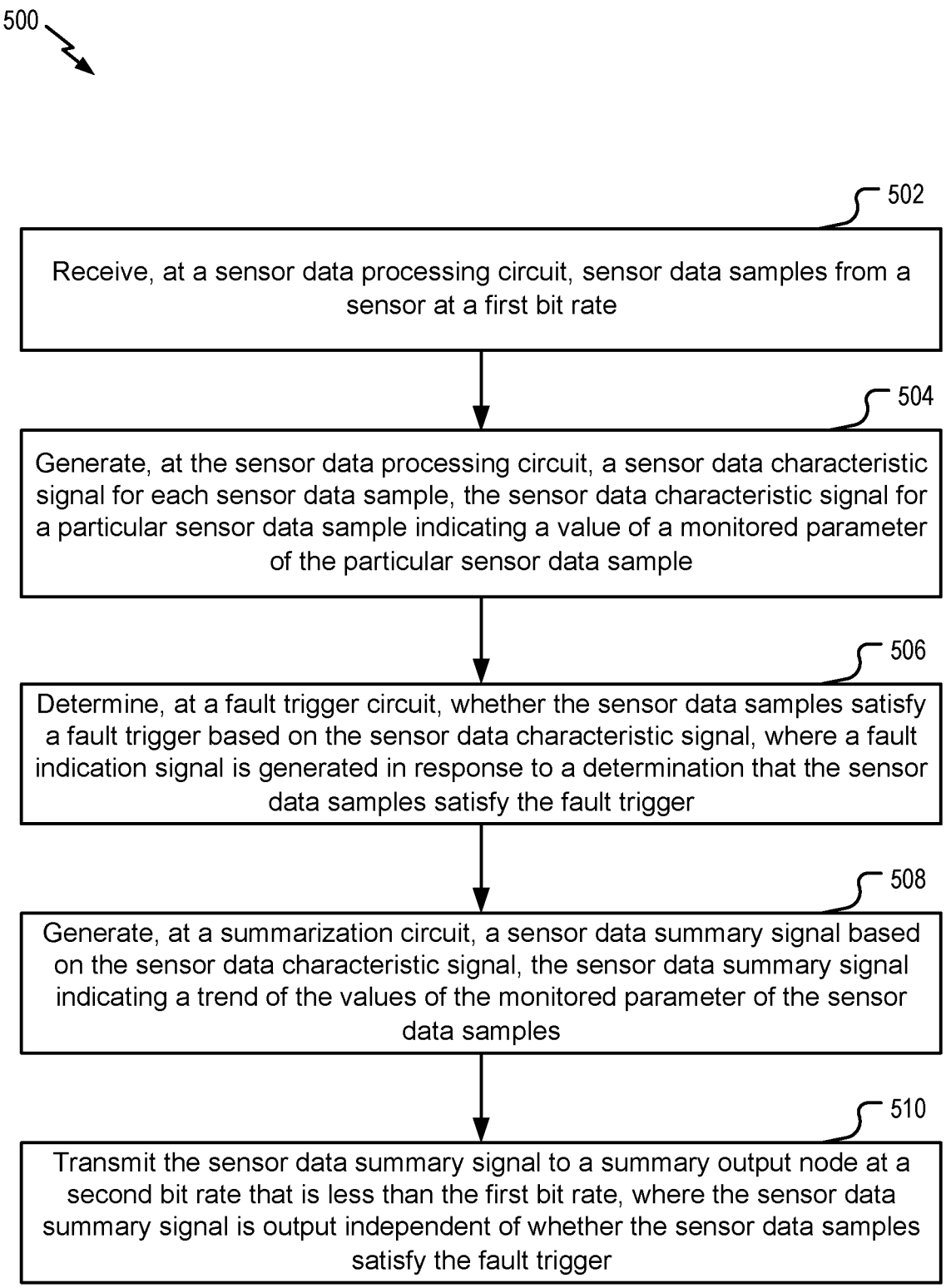
FIG. 5 is a method for summarizing sensor data.

FIG. 5 is a flowchart of a method 500 of summarizing sensor data. The method 500 can be performed by the monitor circuit 100 of FIG. 1 or the system 300 of FIG. 3.

The method 500 includes receiving, at a sensor data processing circuit, sensor data samples from a sensor at a first bit rate, at 502. For example, referring to FIG. 3, the sensor data processing circuit 102 receives the sensor data samples 110 from the sensor 302. Each sensor data sample 110 includes a corresponding value 212-220 of the monitored parameter 200. As described herein, the non-limiting example of the monitored parameter 200 is the electrical anti-lock parameter that indicates the condition the aircraft component 306. The sensor data processing circuit 102 receives the sensor data samples 110 at the first bit rate.

The method 500 also includes generating, at the sensor data processing circuit, a sensor data characteristic signal for each sensor data sample, at 504. The sensor data characteristic signal for a particular sensor data sample indicates a value of a monitored parameter of the particular sensor data sample. For example, referring to FIG. 3, the sensor data processing circuit 102 generates the sensor data characteristic signal 122 for each sensor data sample 110. The sensor data characteristic signal 122 for the sensor data sample 110A indicates the value 212 of the monitored parameter 200 for the sensor data sample 110A, the sensor data characteristic signal 122 for the sensor data sample 110B indicates the value 214 of the monitored parameter 200 for the sensor data sample 110B, the sensor data characteristic signal 122 for the sensor data sample 110C indicates the value of the monitored parameter 200 for the sensor data sample 110C, etc.

The method 500 also includes determining, at a fault trigger circuit, whether the sensor data samples satisfy a fault trigger based on the sensor data characteristic signal, at 506. A fault indication signal is generated in response to a determination that the sensor data samples satisfy the fault trigger. For example, referring to FIG. 3, the fault trigger circuit 104 determines whether the sensor data samples 110 satisfy the fault trigger based on the sensor data characteristic signal 122. To illustrate, the fault trigger can correspond to threshold value associated with the monitored parameter 200. In this illustrative example, if the sensor data samples 110 indicate that the values 212-220 of the monitored parameter 200 are below the threshold value, the fault trigger circuit 104 generates the fault indication signal 124 that is provided to the fault output node 114. Thus, the fault trigger circuit 104 provides the fault indication signal 124 to the fault output node 114 in response to a determination that the sensor data samples 110 satisfy (e.g., are below) the fault trigger. If the fault indication signal 124 is provided to the fault output node 114, when the aircraft 350 lands, aircraft maintenance personnel can be alerted to perform maintenance operations.

The method 500 also includes generating, at a summarization circuit, a sensor data summary signal based on the sensor data characteristic signal, at 508. The sensor data summary signal indicates a trend of the values of the monitored parameter of the sensor data samples. For example, referring to FIG. 3, the summarization circuit 106 generates the sensor data summary signal 126 based on the sensor data characteristic signals 122. The sensor data summary signal 126 summarizes the sensor data characteristic signals 122 by indicating a pattern or trend of the values 212-220 of the monitored parameter 200 of the sensor data samples 110.

The method 500 also includes transmitting the sensor data summary signal to a summary output node at a second bit rate that is less than the first bit rate, at 510. The sensor data summary signal is output independent of whether the sensor data samples satisfy the fault trigger. For example, referring to FIG. 3, the summarization circuit 106 can transmit the sensor data summary signal 126 to the reporting interface 304 at the second bit rate. The sensor data summary signal 126 is generated and transmitted (e.g., output) independent of whether the sensor data samples 110 satisfy the fault trigger such that the remote device 320 is provided early notice of an impending fault.

According to one implementation, the method 500 includes generating one or more data packets based on the sensor data summary signal. The one or more data packets are usable to generate a report that summarizes the condition of the aircraft component. For example, the reporting interface 304 generates the data packets 330 based on the sensor data summary signal 126. The reporting interface 304 transmits the data packets 330, via the bus 322 and at the second bit rate, to the remote device 320 at the remote location 360. The remote device 320 can be located onboard the aircraft 350 or off-board the aircraft 350 to enable maintenance personnel to identify impending failures with the aircraft component 306 prior to the failure occurring (e.g., prior to generation of the fault indication signal 124). For example, maintenance personnel can review the report to determine whether the values 212-220 of the monitored parameter 200 indicate that an impending fault message for the aircraft component 306 will occur within a period of time (e.g., a week, a month, a year, etc.). Based on the determination, maintenance personnel can determine that preventative maintenance action is warranted prior to the fault trigger circuit 104 generating the fault indication signal 124. As a result, maintenance personnel can schedule and perform maintenance operations on the aircraft component 306 prior to a fault occurring and at a convenient time such as not to delay a flight.

The method 500 of FIG. 5 enables early detection of component degradation so that maintenance personnel can proactively schedule maintenance operations at a convenient time prior to a detected aircraft fault. For example, the summarization circuit 106 generates the sensor data summary signal 126 that summarizes relevant information associated with the sensor data samples 110. The reporting interface 304 sends the summary, indicated by sensor data summary signal 126, to the remote device 320 as data packets 330. The data packets 330 are provided to the remote device 320 to enable the remote device 320 to generate a report that indicates whether an impending fault is approaching. As a result, maintenance operators can schedule and perform maintenance operations in such a manner as to not delay a flight.

Figure 6:
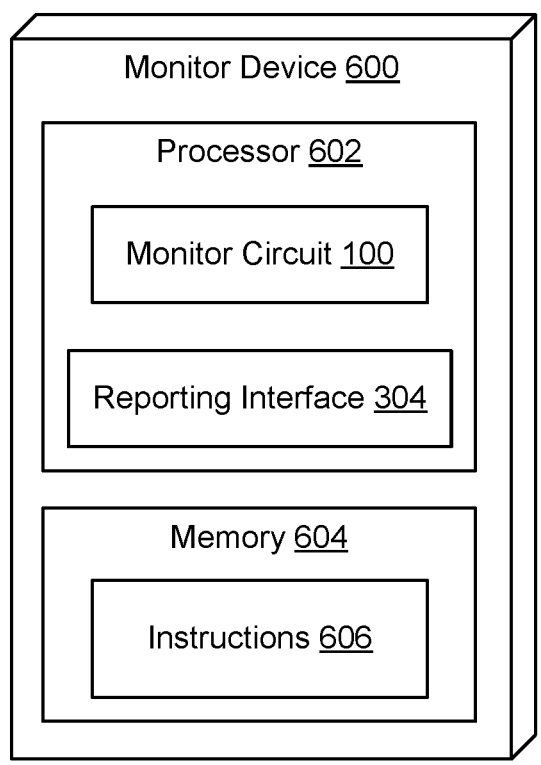
FIG. 6 is a diagram of an example of a monitor device that includes the monitor circuit of FIG. 1.

FIG. 6 is a diagram of an example of a monitor device 600. The monitor device 600 includes a processor 602 and a memory 604. The processor 602 includes the monitor circuit 100 and the reporting interface 304. The memory 604 is a computer-readable storage device that stores instructions 606. The instructions 606 are executable by the processor 602 to perform the method 500 of FIG. 5.

According to one implementation, the monitor device 600 can be integrated into the aircraft 350 illustrated in FIG. 4. For example, the sensor 302 can generate the sensor data samples 110 and provide the sensor data samples 110 to the monitor device 600. Based on the sensor data samples 110, the monitor device 600 can generate the data packets 330 that are transmitted to the remote device 320.

Figure 7:
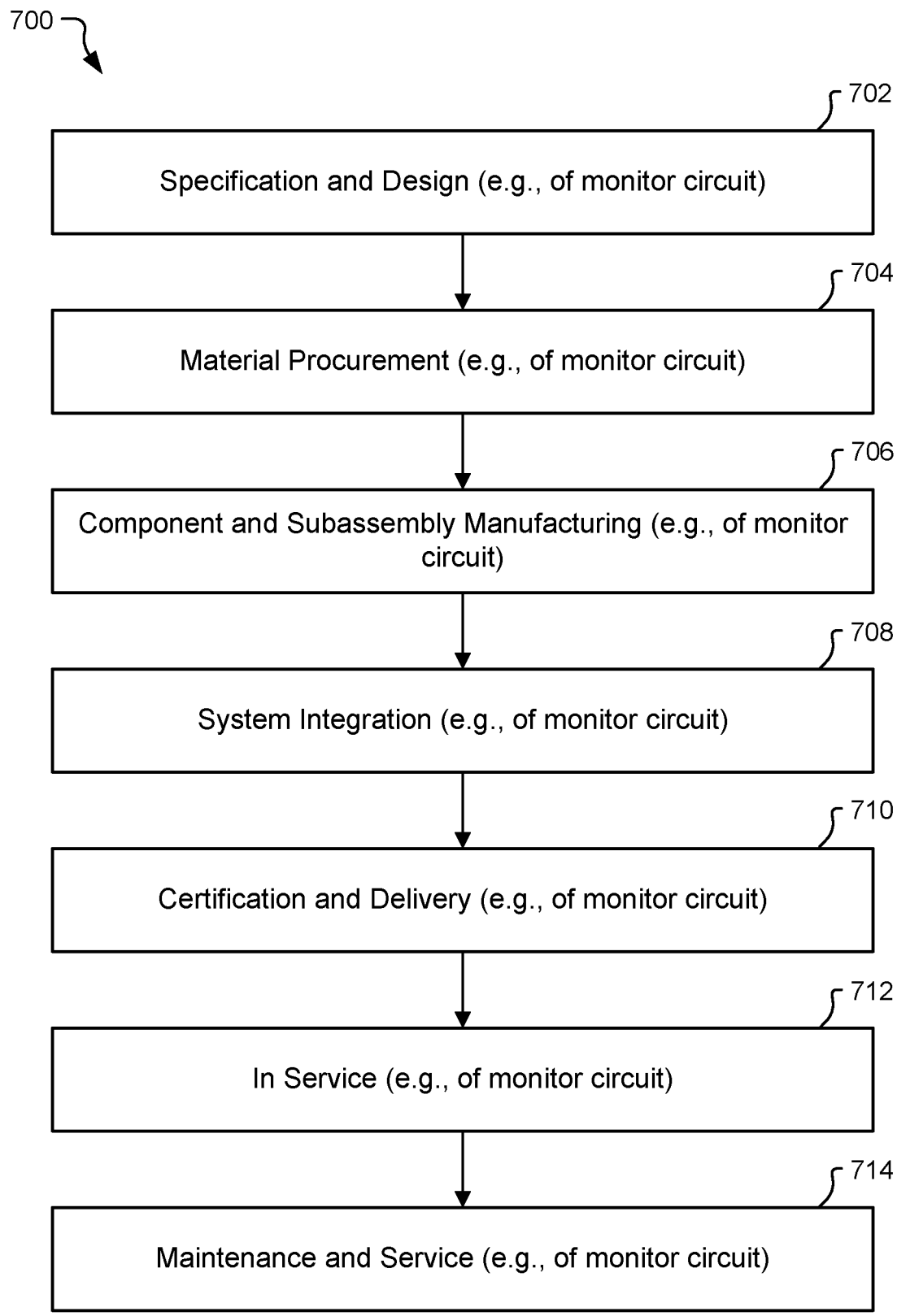
FIG. 7 is a flow chart of an example of a method associated with the aircraft of FIG. 4.

FIG. 7 is a flow chart of an example of a method 700 associated with the aircraft 350. During the life cycle of the aircraft 350, the monitor circuit 100 can be added to the aircraft 350 or the aircraft 350 can be designed and built initially with the monitor circuit 100. In FIG. 7, during pre-production, the method 700 includes, at 702, specification and design of the aircraft 350. During the specification and design of the aircraft 350, the method 700 can include specifying the monitor circuit 100 or components of the monitor circuit 100. At 704, the method 700 includes material procurement. For example, the method 700 can include procuring materials for the monitor circuit 100 (such as materials for the sensor data processing circuit 102, the fault trigger circuit 104, the summarization circuit 106, etc.).

During production, the method 700 includes, at 706, component and subassembly manufacturing and, at 708, system integration of the aircraft 350. In a particular implementation, the component and subassembly manufacturing, at 706, includes manufacturing the monitor circuit 100 or components of the monitor circuit 100. Likewise, the system integration, at 708, includes coupling the monitor circuit 100 or components of the monitor circuit 100 to other components and controllers of the aircraft 350.

At 710, the method 700 includes certification and delivery of the aircraft 350 and, at 712, placing the aircraft 350 in service. In some implementations, certification and delivery includes certifying the monitor circuit 100. Placing the vehicle in service can also include placing the monitor circuit 100 in service. While in service by a customer, the aircraft 350 may be scheduled for routine maintenance and service (which can also include modification, reconfiguration, refurbishment, and so on). At 714, the method 700 includes performing maintenance and service on the aircraft 350. In a particular implementation, the method 700 includes performing maintenance and service on the monitor circuit 100.

Each of the processes of the method 700 is performed or carried out by a system integrator, a third party, and/or an operator (e.g., a customer). For the purposes of this description, a system integrator includes without limitation any number of vehicle manufacturers and major-system subcontractors; a third party includes without limitation any number of venders, subcontractors, and suppliers; and an operator is an airline, leasing company, military entity, service organization, and so on.

Figure 8:
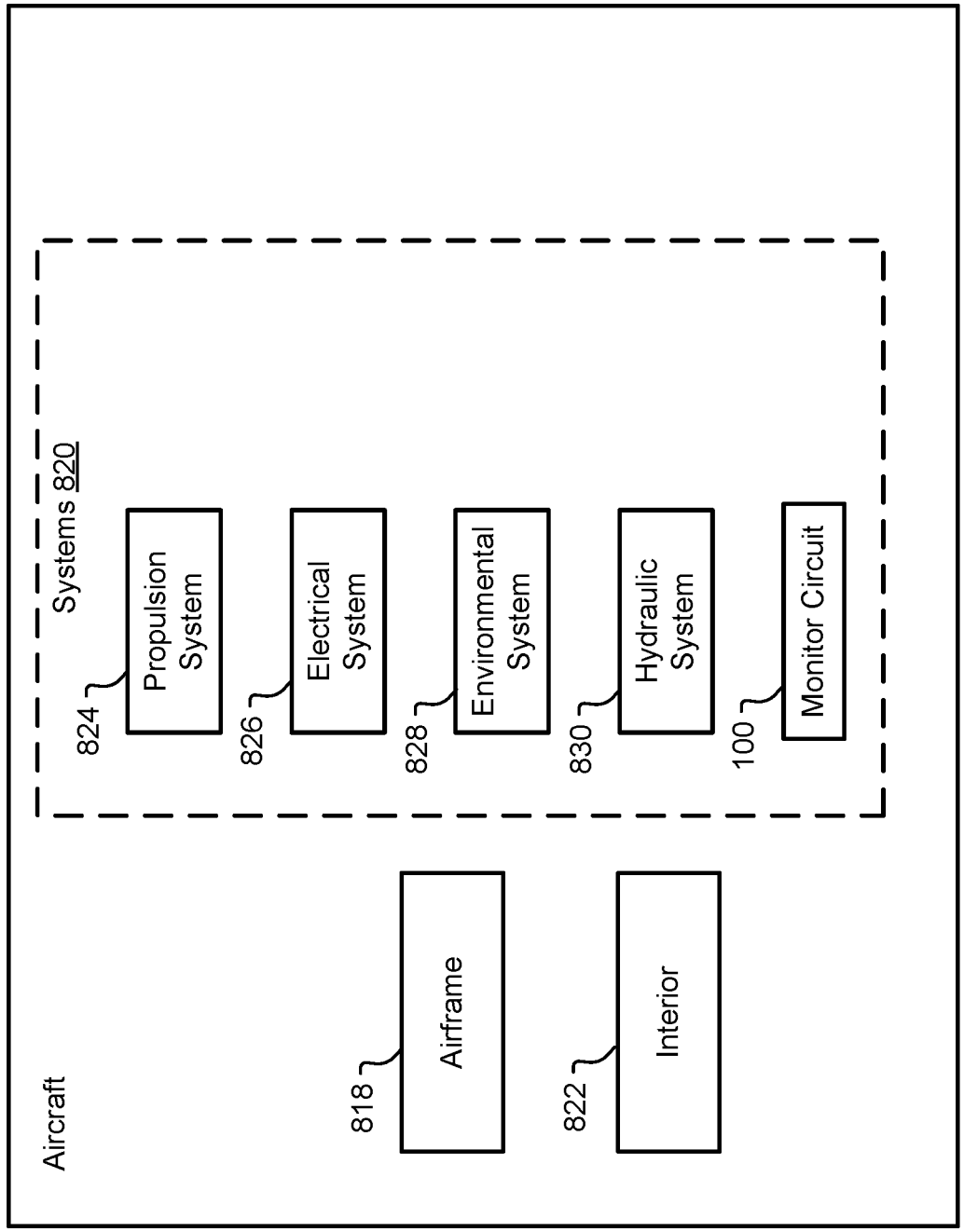
FIG. 8 is a block diagram of the aircraft and the monitor circuit of FIG. 1.

FIG. 8 is a block diagram of a particular example of the aircraft 350 and the monitor circuit 100 of FIG. 1. In a particular implementation, the aircraft 350 is produced by at least a portion of the method 700 of FIG. 7. As shown in FIG. 8, the aircraft 350 includes an airframe 818 with a plurality of systems 820 and an interior 822. Examples of the plurality of systems 820 include one or more of a propulsion system 824, an electrical system 826, an environmental system 828, a hydraulic system 830, and the monitor circuit 100. Any number of other systems may also be included in the aircraft 350.

Apparatus and methods included herein can be employed during any one or more of the stages of the method 700 of FIG. 7. For example, components or subassemblies corresponding to production process 708 can be fabricated or manufactured in a manner similar to components or subassemblies produced while the aircraft 350 is in service, at 712 for example and without limitation. Also, one or more apparatus implementations, method implementations, or a combination thereof can be utilized during the production stages (e.g., stages 702-710 of the method 700), for example, by substantially expediting assembly of or reducing the cost of the aircraft 350. Similarly, one or more of apparatus implementations, method implementations, or a combination thereof can be utilized while the aircraft 350 is in service, at 712 for example and without limitation, to maintenance and service, at 714.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single implementation described herein should be construed as limiting and implementations of the disclosure may be suitably combined without departing form the teachings of the disclosure. As an example, one or more operations described with reference to FIGS. 6-7 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A monitor circuit comprising:
   a sensor node configured to receive sensor data samples at a first bit rate;
   a sensor data processing circuit configured to generate a sensor data characteristic signal for each of the sensor data samples, the sensor data characteristic signal for a particular sensor data sample indicating a value of a monitored parameter of the particular sensor data sample, wherein the sensor data samples from the sensor data characteristic signals includes a group of data samples;
   a summary output node; and
   a summarization circuit configured to:
     receive the sensor data characteristic signals at the first bit rate;
     generate a sensor data summary signal that can be sent at a second bit rate by summarizing the sensor data samples from the sensor data characteristic signals; and
     send the sensor data summary signal to the summary output node at the second bit rate, wherein the second bit rate is less than the first bit rate,
   further wherein to generate the sensor data summary signal, the summarization circuit:
     filters the group of data samples into a first subset of the data samples,
     sets the first subset of the data samples as part of the sensor data summary signal, and
     bypasses a second subset of the group of data samples from the sensor data summary signal.

2. The monitor circuit of claim 1, wherein the sensor data summary signal is output independent of whether the sensor data samples satisfy a fault trigger.

3. The monitor circuit of claim 1, wherein the sensor data summary signal indicates a trend of values of the monitored parameter of the particular sensor data samples.

4. The monitor circuit of claim 1, further comprising a reporting interface configured to transmit at least one data packet, via a bus, to a remote device, wherein the reporting interface transmits the at least one data packet at the second bit rate.

5. The monitor circuit of claim 4, wherein the at least one data packet is based on the sensor data summary signal and is usable to generate a report.

6. The monitor circuit of claim 5, wherein the report indicates a proximity of values of the monitored parameter of the sensor data samples to a fault trigger.

7. The monitor circuit of claim 1, wherein the summarization circuit is configured to apply a data summarization accumulator to the sensor data characteristic signals to generate the sensor data summary signal.

8. The monitor circuit of claim 1, wherein:
   the first subset of the data samples comprises a maximum data value, a minimum data value, and a maximum count value of a monitored parameter.

9. The monitor circuit of claim 1, wherein summarizing the sensor data samples from the sensor data characteristic signals is not based on down-sampling the sensor data samples.

10. A method of summarizing sensor data, the method comprising:
    receiving sensor data samples from a sensor at a first bit rate;
    generating a sensor data characteristic signal for each of the sensor data samples, the sensor data characteristic signal for a particular sensor data sample indicating a value of a monitored parameter of the particular sensor data sample, wherein the sensor data samples from the sensor data characteristic signals includes a group of data samples;
    receiving the sensor data characteristic signals at the first bit rate;
    generating a sensor data summary signal that can be transmitted at a second bit rate by summarizing the sensor data samples from the sensor data characteristic signals; and
    transmitting the sensor data summary signal to a summary output node at the second bit rate that is less than the first bit rate,
    wherein the generating the sensor data summary signal includes:
      filtering the group of data samples into a first subset of the data samples,
      setting the first subset of the data samples as part of the sensor data summary signal, and
      bypassing a second subset of the group of data samples from the sensor data summary signal.

11. The method of claim 10, wherein the sensor data summary signal is output independent of whether the sensor data samples satisfy a fault trigger.

12. The method of claim 11, further comprising:
    generating at least one data packet based on the sensor data summary signal; and
    transmitting at least one data packet, via a bus, to a remote device at the second bit rate, wherein the at least one data packet includes at least a value of the monitored parameter indicated by the sensor data summary signals and is usable to generate a report.

13. The method of claim 12, wherein the report indicates a proximity of values of the monitored parameter of the sensor data samples to the fault trigger.

14. The method of claim 12, wherein the remote device includes a prognostic computing device.

15. The method of claim 10, wherein the first bit rate is a multiple of the second bit rate.

16. The method of claim 10, wherein:
summarizing the sensor data sample from the sensor data characteristic signal is not based on down-sampling the sensor data samples,
the first subset of the data samples comprises a maximum data value, a minimum data value, and a maximum count value of a monitored parameter.

17. A computer-readable storage device storing instructions that, when executed by a processor, cause the processor to perform operations comprising:
receiving sensor data samples from a sensor at a first bit rate;
generating a sensor data characteristic signal for each of the sensor data samples, the sensor data characteristic signal for a particular sensor data sample indicating a value of a monitored parameter of the particular sensor data sample, wherein the sensor data samples from the sensor data characteristic signals includes a group of data samples;
receiving the sensor data characteristic signals at the first bit rate;
generating a sensor data summary signal that can be transmitted at a second bit rate by summarizing the sensor data samples from the sensor data characteristic signals; and
initiating transmission of the sensor data summary signal to a summary output node at the second bit rate that is less than the first bit rate,
further wherein the generating includes:
filtering the group of data samples into a first subset of the data samples,
setting the first subset of the data samples as part of the sensor data summary signal, and
bypassing a second subset of the group of data samples from the sensor data summary signal.

18. The computer-readable storage device of claim 17, wherein summarizing the sensor data samples from the sensor data characteristic signals is not based on down-sampling the sensor data samples.

19. The computer-readable storage device of claim 17, wherein the first bit rate is a multiple of the second bit rate.

20. The computer-readable storage device of claim 17, wherein the operations further comprise:
determining whether the sensor data samples satisfy a fault trigger based on the sensor data characteristic signals, wherein a fault indication signal is generated in response to a determination that the sensor data samples satisfy the fault trigger; and
wherein:
the sensor data summary signal is output independent of whether the sensor data samples satisfy the fault trigger,
the first subset of the data samples comprises a maximum data value, a minimum data value, and a maximum count value of a monitored parameter.

\* \* \* \* \*